Oct. 12, 1926. 1,602,986
J. H. MASON
COATED FABRIC AND PROCESS OF MAKING SAME
Filed Feb. 25, 1920
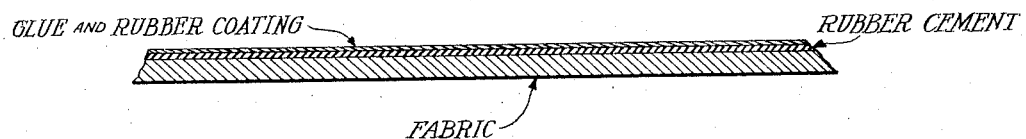
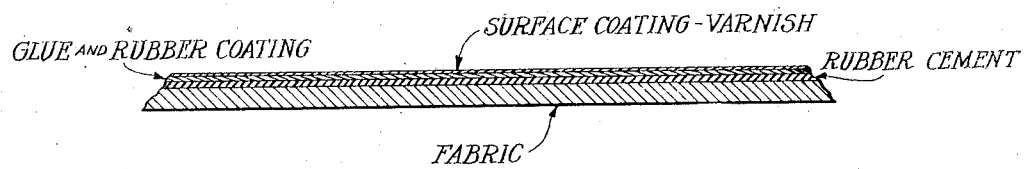
INVENTOR
Jesse H. Mason
BY
ATTORNEY Patented Oct. 12, 1926.

1,602,986

UNITED STATES PATENT OFFICE.

JESSE H. MASON, OF ROSELLE, NEW JERSEY, ASSIGNOR TO DURATEX CORPORATION, OF NEWARK, NEW JERSEY, A CORPORATION OF NEW JERSEY.

COATED FABRIC AND PROCESS OF MAKING SAME.

Application filed February 25, 1920. Serial No. 361,227.

This invention relates to improvements in coated fabrics and the process of making same. This invention relates particularly to rubber coated fabrics such as are used in the manufacture of automobile tops, raincoats, slickers, hospital sheeting, toilet cases and similar products.

One of the leading objects of my invention is to provide a coated fabric having a coating or film which is more pliable, tougher and more wear-resisting than any rubber-coated fabrics heretofore produced and which is absolutely unaffected by temperature changes or exposure to sunlight, even when such exposure is long-continued. Another object of my invention is to provide a coated fabric having a coating which is not oxidizable even after long exposure to the air.

Another object of my invention is to provide an improved process for making coated fabrics by which a coated fabric of superior qualities may be produced at a lower cost.

In the accompanying drawing I have illustrated sections of fabric to which various coats embodying my invention have been applied, Figure 1, showing the fabric without the varnish, and Figure 2, showing the fabric with the varnish applied to the coating.

In general, I carry out the object of my invention by applying to a suitable fabric base a coating made up of a mixture of rubber and glue to which reclaimed rubber, rubber substitutes, pigments and vulcanizing ingredients may be added as desired. Any suitable type or quality of glue may be used, but the use of glue which has been "hardened" or rendered substantially insoluble in water, by the use of tanning agents or other reagents, and the properties of which are thereby changed or altered to produce a leather-like substance, is to be avoided. I have found that very desirable results are secured when the rubber and glue are present in substantially equal parts. After this coating has been applied to the base it is vulcanized thereon in the manner well understood in the art.

I have secured very desirable results by the use of a coating composition having the following formula:

| | Parts. |
|---|---|
| Crude rubber | 30 |
| Glue | 30 |
| Reclaimed rubber | 10 |
| Mineral rubber | 10 |
| Carbon black | 3 |
| Whiting | 8 |
| Litharge | 7 |
| Sulphur | 2 |
| | 100 |

This composition forms a black coating such as might be used for automobile top material or for upholstery material.

I have also secured very good results by the use of a coating composition having the following formula:

| | Parts. |
|---|---|
| Crude rubber | 35 |
| Glue | 35 |
| Rubber factice | 8 |
| Yellow ochre | 6 |
| Burnt sienna | 3 |
| Aluminum flake | 6 |
| Magnesia oxide | 4 |
| Thio-carbanilid | 1 |
| Sulphur | 2 |
| | 100 |

This gives a tan coating suitable for raincoats, slickers and the like.

The coating composition is prepared by first mixing the crude rubber and glue until the mixture forms a smooth, homogeneous mass. This can be done conveniently on a rubber mill. After the rubber and glue are thoroughly mixed the other ingredients are added and mixed. I find that it is desirable and advisable to mix the basic ingredients, glue and crude rubber, before the other ingredients are added.

In making the coated fabrics, I first give the fabric base one coat of a suitable vulcanizing rubber cement. This may be done on a spreading machine of the character well known in this art. A coat or film of the glue and rubber composition, prepared as described above, of whatever thickness may be required, is then applied. This may be done by means of an ordinary coating calender. The coated fabric is then vulcanized in the usual way. I may apply a surface coating of a suitable waterproofing varnish and this may be applied either before or after vulcanization.

I find that the proper mixture of glue with rubber has the following important effects; first, it increases the bulk of the mixture without detracting materially from its elasticity and tensile strength. Second, it gives a harder and tougher film than pure rubber. Third, the glue constitutes an adulterant for rubber of low cost and low specific gravity and, since both rubber and glue are colloids, it permits of the further incorporation in the mixture of dry, inert ingredients. Fourth, this mixture is not affected by temperature changes and is not oxidizable. It is known that pure glue shows no physical change due to temperature changes and I have found the mixture of glue and rubber has the same valuable property, so that I have eliminated one objection to ordinary rubber coating, that is, the tendency to soften in hot weather and stiffen in cold weather. I have found that this glue and rubber mixture will not oxidize even after long exposure in the air, and I, therefore, eliminate one objection to ordinary rubber-coated fabrics which tend to check or crack after long exposure to the sun and will oxidize or harden losing some of their pliability after long exposure to the air.

The proportions of the ingredients may be varied according to the results which it is desired to produce. For instance, if I wish a very hard and tough coating, I may use no other plastic ingredients than rubber and glue which mixture might constitute as much as 85% of the batch. When I wish a very resilient and elastic coating, I use an excess of rubber over glue and, on the other hand, when I wish a very hard, tough and less flexible coating I use an excess of glue over rubber. In this latter case, I find it expedient to apply a surface coating of a suitable waterproofing varnish to protect the glue and rubber mixture from the softening influence of water. This surface coating may be applied either before or after the vulcanization of the glue and rubber coating.

I am aware that the particular embodiment of my invention which I have disclosed is susceptible of considerable variation without departing from the spirit thereof, and, therefore, I wish to claim my invention broadly, as well as specifically, as indicated by the appended claims.

Having thus described my invention, what I claim as new and desire to secure by Letters Patent is:

1. A coated fabric comprising a fabric base and a vulcanized mixture of rubber and glue applied thereto and carried thereby.

2. A coated fabric comprising a fabric base and a vulcanized homogeneous mixture of rubber and glue applied thereto and carried thereby.

3. A coated fabric comprising a fabric base and a vulcanized coating carried by said base and embodying a mixture of rubber and glue.

4. A coated fabric comprising a fabric base, a vulcanized coating carried by said base and embodying a mixture of rubber and glue, and a surface coating of water proofing varnish.

5. A coated fabric comprising a fabric base and a vulcanized coating carried by said base and embodying a mixture of rubber, glue and suitable pigments.

6. A coated fabric comprising a fabric base, a coating of vulcanized rubber and a coating embodying a mixture of rubber and glue.

7. A coated fabric comprising a fabric base, a coating of vulcanized rubber, a coating embodying a mixture of glue and rubber, and a surface coating of waterproofing varnish.

8. A coated fabric comprising a fabric base and a mixture of substantially equal parts of glue and rubber applied thereto and carried thereby.

9. A coated fabric comprising a fabric base and a vulcanized coating carried by said base and embodying substantially equal parts of rubber and glue.

10. A coated fabric comprising a fabric base, a vulcanized coating carried by said base and embodying substantially equal parts of rubber and glue, and a surface coating of suitable varnish.

11. A coated fabric comprising a fabric base, a coating of vulcanized rubber and a vulcanized coating embodying a mixture of substantially equal parts of rubber and glue.

12. A coated fabric comprising a fabric base, a coating of vulcanized rubber, a vulcanized coating embodying a mixture of substantially equal parts of rubber and glue, and a surface coating of water proofing varnish.

13. The process of making coated fabrics comprising applying a mixture of rubber and glue to a fabric base and vulcanizing said mixture on said base.

14. The process of making coated fabrics comprising applying a coating of vulcanizing rubber cement to a fabric base, and applying a coating embodying a mixture of rubber and glue above said cement coating.

15. The process of making coated fabrics comprising, first applying a coating of vulcanizing rubber cement to a fabric base, second, applying a coating embodying a mixture of glue and rubber above said cement coating, and third, vulcanizing the coatings thus applied.

16. The process of making coated fabrics comprising, first applying a coating of vulcanizing rubber cement to a fabric base, second, applying a coating embodying a mixture of rubber and glue above said cement coating and, finally applying a surface coating of waterproofing varnish.

17. A coated fabric comprising, a fabric base and a vulcanized mixture of rubber and glue in such proportions as to provide a relatively hard and tough, pliable coating applied thereto and carried thereby.

18. A coated fabric comprising, a fabric base, a vulcanized coating carried by said base and embodying a mixture of rubber and glue in such proportions as to get a relatively hard, tough, pliable coating applied thereto and a surface of waterproofing varnish applied thereover.

In testimony whereof, I affix my signature.

JESSE H. MASON.